(12) United States Patent
Chase et al.

(10) Patent No.: US 7,007,720 B1
(45) Date of Patent: Mar. 7, 2006

(54) EXHAUST TIP

(75) Inventors: Lee A. Chase, Kentwood, MI (US); Kevin Paul Burch, Clinton Township, MI (US)

(73) Assignee: Lacks Industries, Inc., Grand Rapids, MI (US)

( * ) Notice: Subject to any disclaimer, the term of this patent is extended or adjusted under 35 U.S.C. 154(b) by 505 days.

(21) Appl. No.: 09/542,410

(22) Filed: Apr. 4, 2000

(51) Int. Cl.
*F16L 57/00* (2006.01)

(52) U.S. Cl. .................. 138/110; 138/112; 138/113; 138/148; 181/227; 181/249

(58) Field of Classification Search ............. 138/110, 138/112, 113, 114, 148; 181/227, 247, 248, 181/249
See application file for complete search history.

(56) References Cited

U.S. PATENT DOCUMENTS

| | | | |
|---|---|---|---|
| 2,620,893 A | * 12/1952 | Holt et al. | |
| 3,509,917 A | * 5/1970 | Gartner | 138/114 |
| 3,661,670 A | 5/1972 | Pierpont, Jr. | |
| 3,752,260 A | * 8/1973 | Heath | 181/47 R |
| 3,835,892 A | 9/1974 | Keller | |
| 3,908,372 A | * 9/1975 | Fowler et al. | 138/114 |
| 3,934,617 A | * 1/1976 | Henderson | 138/114 |
| 3,938,233 A | * 2/1976 | Cannon | 138/114 |
| 4,356,885 A | 11/1982 | Dello | |
| 4,413,657 A | 11/1983 | Sasaki et al. | |
| 4,484,785 A | * 11/1984 | Jackson | 138/110 |
| 4,589,515 A | 5/1986 | Omura | |
| 4,779,904 A | * 10/1988 | Rich | 285/345 |
| 5,173,576 A | 12/1992 | Feuling | |
| 5,330,234 A | * 7/1994 | Sweeny | 285/62 |
| D351,579 S | 10/1994 | Simpson | |
| 5,371,331 A | 12/1994 | Wall | |
| 5,443,098 A | 8/1995 | Kertesz | |
| 5,466,900 A | 11/1995 | Knapp | |
| 5,508,478 A | 4/1996 | Barry | |
| D384,319 S | 9/1997 | Harutiunian | |
| 5,720,319 A | 2/1998 | Smith et al. | |
| D397,661 S | 9/1998 | Harutiunian | |
| 5,907,134 A | * 5/1999 | Nording et al. | 138/113 |
| 5,974,784 A | 11/1999 | Feldman | |
| 6,012,493 A | 1/2000 | Remke et al. | |
| 6,145,547 A | * 11/2000 | Villatte | 138/148 |

* cited by examiner

*Primary Examiner*—James Hook
(74) *Attorney, Agent, or Firm*—VanOphem & VanOphem, P.C.

(57) ABSTRACT

An exhaust tip for attachment to a tailpipe that includes a thermoset heat shield at least partially surrounding and fastened to the tailpipe, and a thermoplastic decorative cover at least partially surrounding and fastened to the thermoset heat shield. The thermoset heat shield insulates the thermoplastic decorative cover from thermal effects of the tailpipe and spaces the thermoplastic decorative cover a predetermined distance away from the tailpipe.

35 Claims, 8 Drawing Sheets

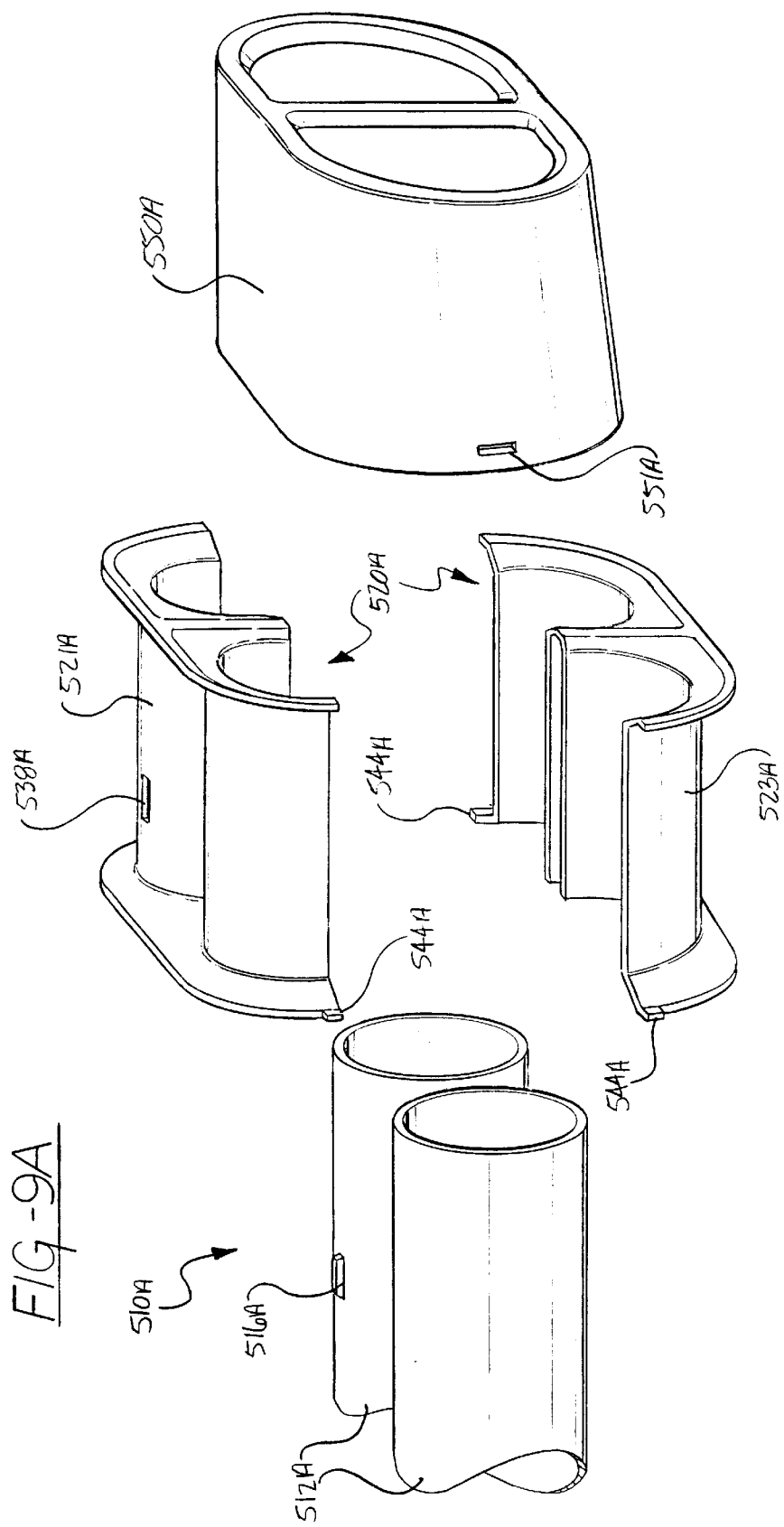

EXHAUST TIP

BACKGROUND OF THE INVENTION

1. Field of the Invention

The present invention generally relates to an exhaust assembly for an exhaust system. More specifically, the present invention relates to a decorative polymeric exhaust tip that attaches to a tailpipe extending from an engine exhaust system

2. Description of the Prior Art

Many engines include exhaust systems for exhausting extremely hot combustion gas to the atmosphere. The exhaust system may include a manifold connected to the engine, exhaust piping, a muffler, a tailpipe, and often a decorative exhaust tip mounted to the tailpipe. Decorative exhaust tips have been used on exhaust systems since at least the 1950's to provide aesthetic accent to a vehicle and perhaps provide an unconscious cue of engine power. Today, exhaust tips are generally made of stainless steel, plated stainless steel, clear-coated stainless steel, or buffed cast aluminum, and are attached in a variety of ways. Unfortunately, these exhaust tips have severe design restrictions, are relatively expensive, and have limited life due to relatively poor corrosion resistance. Therefore, what is needed is an inexpensive, longer lasting alternative that can be molded to comply with severe design restrictions and replace the metal decorative exhaust tips of the past. At present, no such exhaust system components meet this criteria.

SUMMARY OF THE INVENTION

According to the present invention there is provided a device that satisfies the need for an inexpensive, longer lasting, more compliant decorative exhaust tip, that can be molded to comply with severe design restrictions, and thus replace the metal decorative exhaust tips of the past. Consequently, there is disclosed an exhaust assembly for attachment to an exhaust pipe that includes a heat shield at least partially surrounding and fastened to the tailpipe, and a decorative cover at least partially surrounding and fastened to the heat shield. The heat shield insulates the decorative cover from thermal effects of the tailpipe and spaces the decorative cover a predetermined distance away from the tailpipe.

Additionally, the heat shield and decorative cover may include vent openings for cooling air to pass therethrough and between the heat shield and decorative cover to keep the decorative cover relatively cool. Additionally, the heat shield is preferably molded from a thermoset material while the decorative cover is preferably molded from a thermoplastic material to enable the decorative cover to be chrome-plated or painted. Finally, the heat shield may be constructed from two separate pieces to enable more flexibility in the aesthetic design of the exhaust tip.

Accordingly, it is an object of the present invention to provide an exhaust tip that eliminates the necessity of constructing exhaust tips from metal materials.

It is another object to provide an exhaust tip that is less expensive to manufacture and assemble than conventional designs.

It is yet another object to provide an exhaust tip that is corrosion free and therefore lasts longer than traditional metal designs.

It is still another object to provide an exhaust tip that enables greater freedom in design since it is more easily moldable in almost any shape compared to traditional metal designs.

It is a further object to provide an exhaust tip that may be integral with thermoplastic fascia of a vehicle, or at least integrally fastened to thermoplastic fascia of a vehicle.

These objects and other features, aspects, and advantages of this invention will be more apparent after a reading of the following detailed description, appended claims, and accompanying drawings.

BRIEF DESCRIPTION OF THE DRAWINGS

FIG. 9A is an exploded perspective view of a variation of the exhaust tip of FIGS. 8 and 9, illustrating a split clamshell heat shield;

DETAILED DESCRIPTION OF THE PREFERRED EMBODIMENT

In general, the present invention includes a polymers exhaust tip for use with an engine exhaust system in which a unique configuration is employed to permit use of a polymeric decorative cover. While the present invention is described for use with an engine exhaust system, the present invention is also well suited for use with an exhaust system for any high temperature source. Furthermore, the term gap also means space, passage, or opening where used to describe the spacing of components of the present invention. The phrase interference fit means a condition in which components are mated together in interference of certain features under all tolerance conditions, and is sufficient to hold the components together under a predetermined load. The phrase integral fastening features connotes male and female features integrally formed on mating components for fastening the components together, and is not limited to tabs and slots, or projections and recesses. Furthermore, while the phrase decorative cover is used here to describe a smaller exhaust system component, it is understood that the phrase may cover larger non-exhaust system components such as a vehicle bumper, body molding, or thermoplastic fascia.

Figure 1:
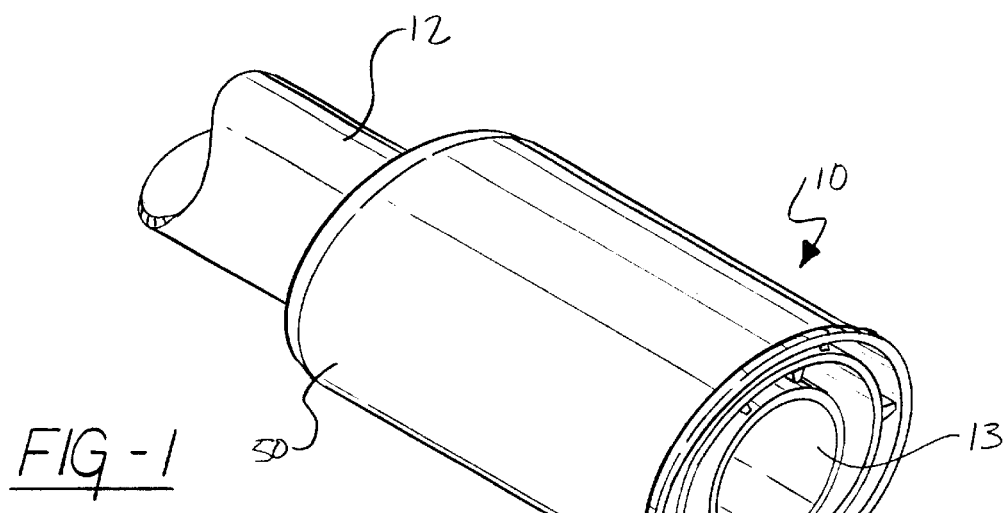
FIG. 1 is a perspective view of an exhaust tip assembled to a tailpipe according to the present invention.

Referring now in detail to the figures, FIG. 1 illustrates an exhaust assembly or tip 10 of the present invention mounted to an exhaust pipe or tailpipe 12. The exhaust tip 10 is mounted at a downstream end 13 of the tailpipe 12 and includes a heat shield 20 coaxially mounted over the tailpipe 12. A decorative cover 50 is coaxially mounted over the heat shield 20 such that the decorative cover 50 is radially spaced apart from the tailpipe 12 a predetermined distance. The distance will necessarily vary from one type of vehicle to another, depending upon the operating temperature of the tailpipe 12, and must be determined for each type of vehicle through testing.

The heat shield 20 may be composed of any appropriate material, but is preferably composed of a thermoset, such as polyvinylester produced from a compression molding, glass matte transfer molding, or bulk molding process. In contrast, the decorative cover 50 may be composed of any appropriate material, but is preferably composed of a plating grade thermoplastic, such as polycarbonate/acrylonitrile-butadiene-styrene (PC/ABS). Further, the decorative cover 50 can be plated or painted, for example with an attractive chrome finish. Other high heat resistant and weatherable materials would also be suitable for non-painted or plated applications. Both the decorative cover 50 and heat shield 20 may be manufactured by any known method for the appropriate material used, but is preferably injection molded, sheet molded, vacuum formed, or blow molded.

Figure 2:
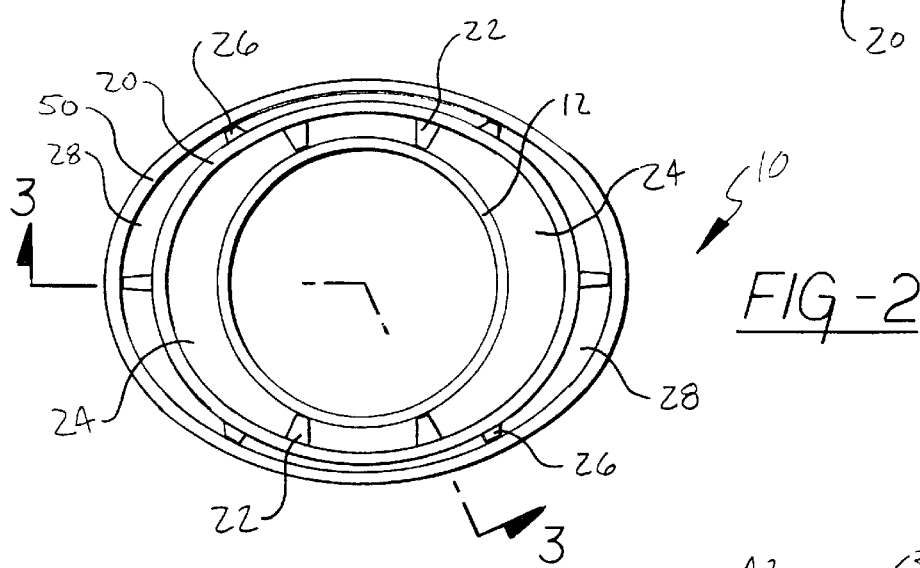
FIG. 2 is an end view of the exhaust tip and tailpipe of FIG. 1 taken in the direction of arrow 2 of FIG. 1.

FIG. 2 illustrates a rear end view of the present invention taken in the direction of arrow 2 of FIG. 1. FIG. 2 shows the heat shield 20 mounted over the tailpipe 12 with internal standoffs 22 provided on the heat shield 20 to space the heat shield 20 equidistant from the tailpipe 12 and establish a primary gap 24 therebetween. Likewise, FIG. 2 shows the decorative cover 50 mounted over the heat shield 20 with external standoffs 26 provided on the heat shield 20 to space the decorative cover 50 equidistant from the heat shield 20 to establish a secondary gap 28 therebetween. Note that the standoffs 22 and 26 are sized for minimal contact area between the components.

Figure 3:
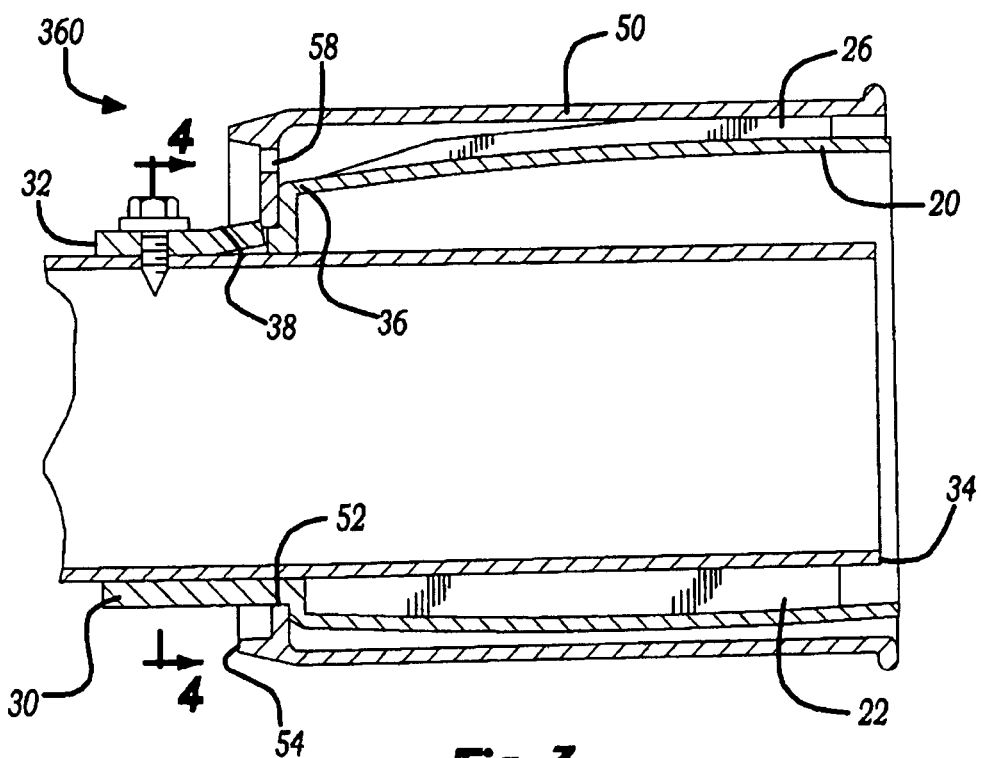
FIG. 3 is an offset cross-sectional view taken along line 3—3 of FIG. 2 that illustrates how the decorative cover fastens to the heat shield and how the heat shield standoffs support the decorative cover.

FIG. 3 illustrates a cross section of the present invention along line 3—3 of FIG. 2. Here, the standoffs 22 and 26 are shown extending longitudinally along the axis of the exhaust tip 10. The decorative cover 50 may also include at least one vent opening 58 at an upstream end 54 through which ambient cooling air passes. FIG. 3 further illustrates the preferred manner of fastening the decorative cover 50 to the heat shield 20. The heat shield 20 has a neck portion 30 beginning at an upstream end 32, opposite a downstream end 34, and terminating in a shoulder portion 36. At least one resilient tab 38 is provided on the neck portion 30. The neck portion 30 of the heat shield 20 fits into a reduced diameter 52 at the upstream end 54 of the decorative cover 50 such that the reduced diameter 52 fits past the resilient tab 38 and abuts the shoulder portion 36 to entrap the decorative cover 50 therebetween.

Figure 4:
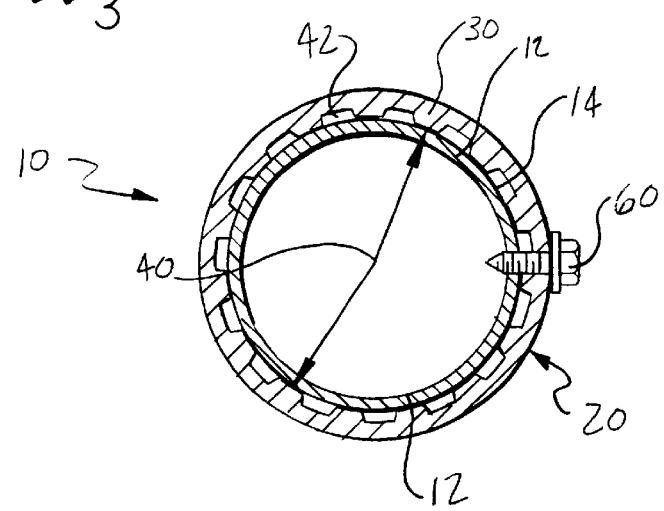
FIG. 4 is a cross-sectional view taken along line 4—4 of FIG. 3 and rotated 90°, illustrating how the heat shield may be fastened to the tailpipe.

FIG. 4 is a cross section of FIG. 3 along line 4—4 thereof, illustrating how the exhaust tip 10 is in turn fastened to the tailpipe 12. The neck portion 30 of the heat shield 20 has an internal diameter 40 that preferably mounts firmly about an external diameter 14 of the tailpipe. A fastener 60, such as a sheet metal screw, rivet, or the like, passes through the heat shield 20 and into the tailpipe 12 to hold the two components together. Also, the exhaust tip 10 preferably has axial passages 42 between the neck portion 30 and the tailpipe 12 to permit cooling air to pass therethrough.

Referring again to FIG. 2, the exhaust tip 10 may be fastened together and to the tail pipe 12 in an alternative manner. Accordingly, the internal standoffs 22 may integrally fasten the heat shield 20 to the tail pipe 12 via an interference fit between the internal standoffs 22 and the outside of the tail pipe 12. Similarly, the external standoffs 26 may integrally fasten the decorative cover 50 to the heat shield 20 via an interference fit between the external standoffs 26 and the inside of the decorative cover 50.

Figure 5:
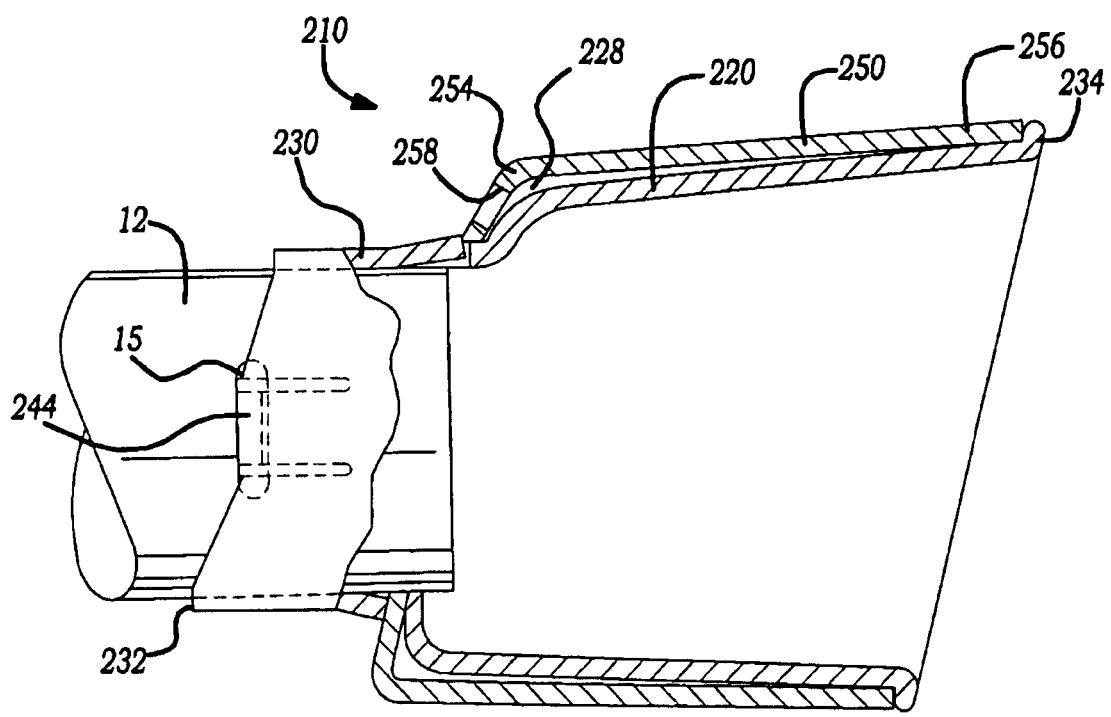
FIG. 5 is a cross-sectional view of an embodiment according to the present invention, illustrating alternative fastening and standoff configurations.

FIG. 5 is a cross section of an embodiment of an exhaust tip 210 according to an alternative embodiment of the present invention. Specifically, FIG. 5 illustrates an alternative structure to maintain space between a heat shield 220 and a decorative cover 250. In contrast to the preferred embodiment, a gap 228 is maintained by supporting a downstream end 256 of the decorative cover 250 at a downstream end 234 of the heat shield 220 and supporting an upstream end 254 of the decorative cover 250 on a neck portion 230 of the heat shield 220, while maintaining the gap 228 therebetween. Also, the axial passages 42 of FIG. 4 may likewise be incorporated into the heat shield 220 of this embodiment. Similarly, the decorative cover 250 includes a vent opening 258 through which cooling air passes to further cool the exhaust tip 210.

Still referring to FIG. 5, this embodiment highlights an alternative structure to retain the heat shield 220 on the tail pipe 12. The heat shield 220 may include at least one resilient tang 244 on the neck portion 230 that interlocks with a feature such as a projection or a recess 16 in the tail pipe 12. In this configuration, an upstream end 232 of the heat shield 220 would assemble over the end of the tail pipe 12 until the resilient tang 244 drops into the recess 16, thereby securing the components together. The decorative cover 250 is retained on the heat shield 220 according to the preferred manner as disclosed in FIG. 3.

Figure 6:
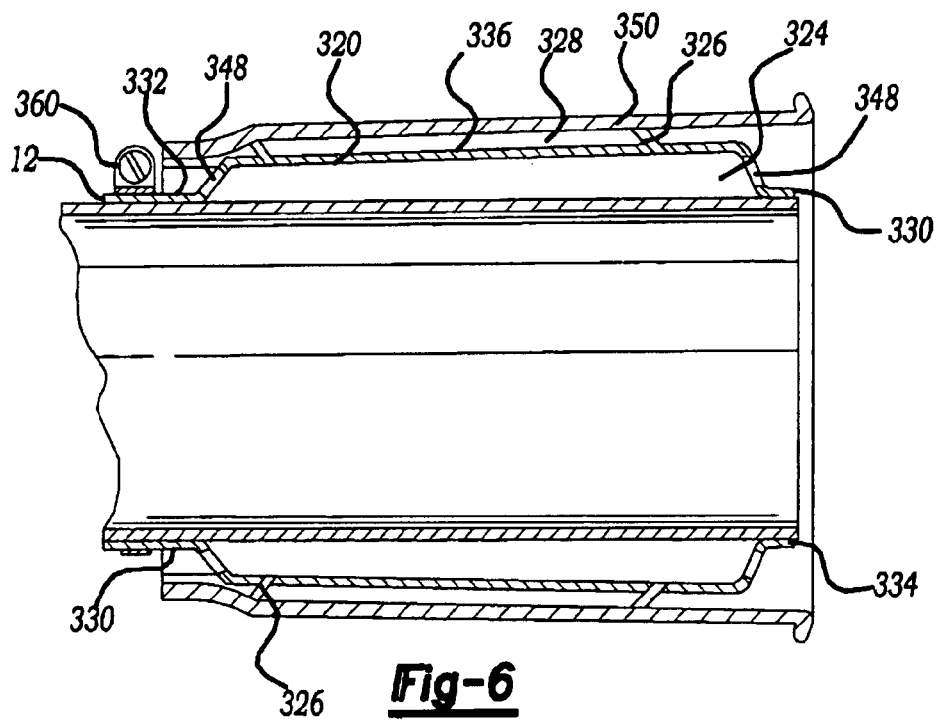
FIG. 6 is a cross-sectional view of another embodiment illustrating a decorative cover mounted to a steel heat shield.

FIG. 6 illustrates a cross section of another embodiment in which a steel heat shield 320 is mounted between the tailpipe 12 and a decorative cover 350. In this configuration a primary gap 324 is defined by the difference in diameter between neck portions 330, at both an upstream end 332 and downstream end 334 of the heat shield 320, and a shoulder diameter 336. A secondary gap 328 is defined between the shoulder diameter 336 and the decorative cover 350 by external standoffs 326 punched into and extended outside of the shoulder diameter 336. Lastly, vent openings 348 are pierced into the heat shield 320 between the neck portions 330 and the shoulder diameter 336 for cooling air to pass therethrough.

The heat shield 320 is fastened to the tailpipe 12 via a hose clamp 360 that compresses the neck portion 330 at the upstream end 332 of the heat shield 320 around the tailpipe 12. The decorative cover 350 is integrally fastened to the heat shield 320 by sliding the decorative cover 350 over the heat shield 320 from the downstream end 334 up toward the upstream end 332. Thus, the external standoffs 326 hold the inside of the decorative cover 350 in an interference fit condition.

Figure 7:
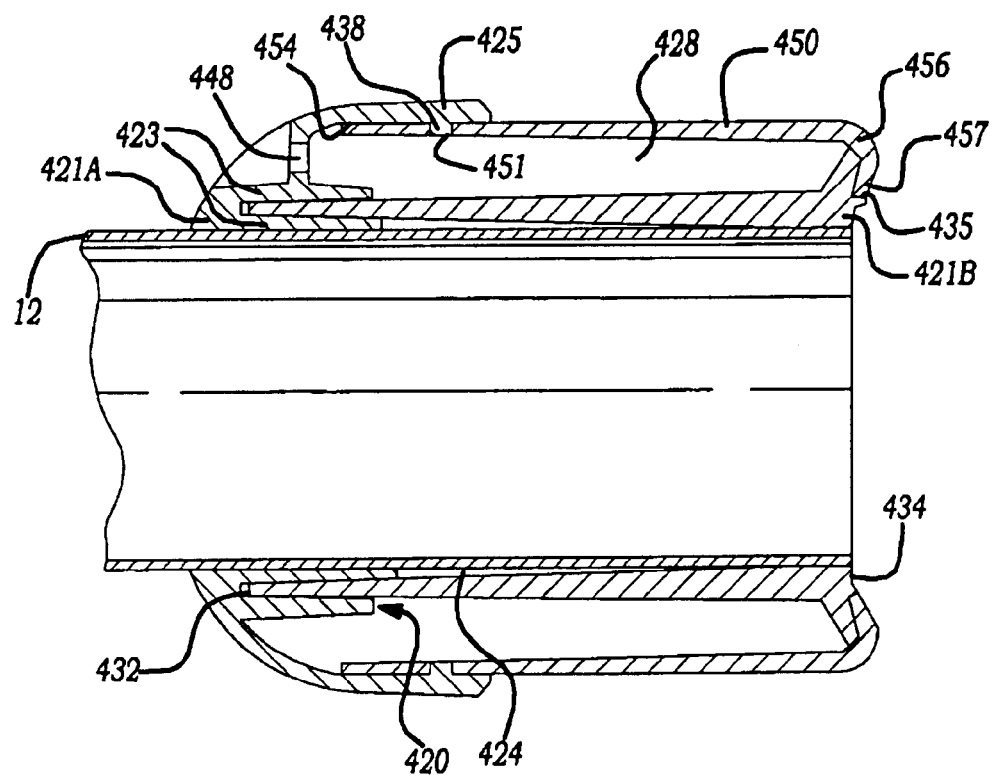
FIG. 7 is cross-sectional view of yet another embodiment illustrating the heat shield as a two-piece system.

FIG. 7 illustrates an embodiment of a two-piece heat shield 420 that includes an upstream shield 421A and a downstream shield 421B. The upstream shield 421A is bowl-shaped and has a mouth portion 423 spaced radially away from the tail pipe 12, and a rim portion 425 spaced even further radially away from the tail pipe 12. The downstream shield 421B has an upstream end 432 that interlocks with the mouth portion 423 of the upstream shield 421A and extends downstream terminating in a downstream end 434. A primary gap 424 is thereby established between the heat shield 420 and the tail pipe 12. The heat shield 420 is integrally fastened to the tail pipe 12 via an interference fit therebetween. In this embodiment, a decorative cover 450 has an upstream end 454 that interlocks with the rim portion 425 of the upstream shield 421A via a tab 438 on the heat shield 420 inserted into a slot 451 of the decorative cover 450. Simultaneously, a downstream projection 457 on the decorative cover 450 at a downstream end 456 pilots to a recessed diameter portion 435 of the heat shield 420 to further locate and lock the decorative cover 450 to the heat shield 420 to establish a secondary gap 428 between the decorative cover 450 and the heat shield 420. Additionally, a vent opening 448 in the upstream shield 421A permits cooling air to flow therethrough.

Figure 8:
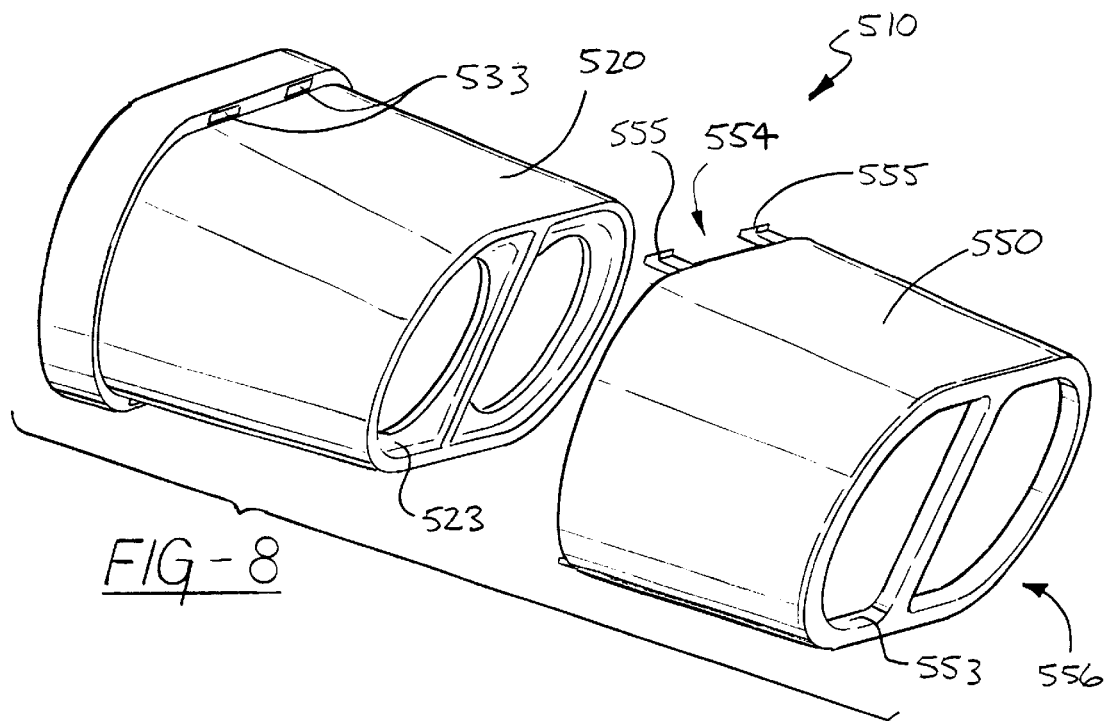
FIG. 8 is an exploded view of a further embodiment illustrating a dual passage exhaust tip.
Figure 9:
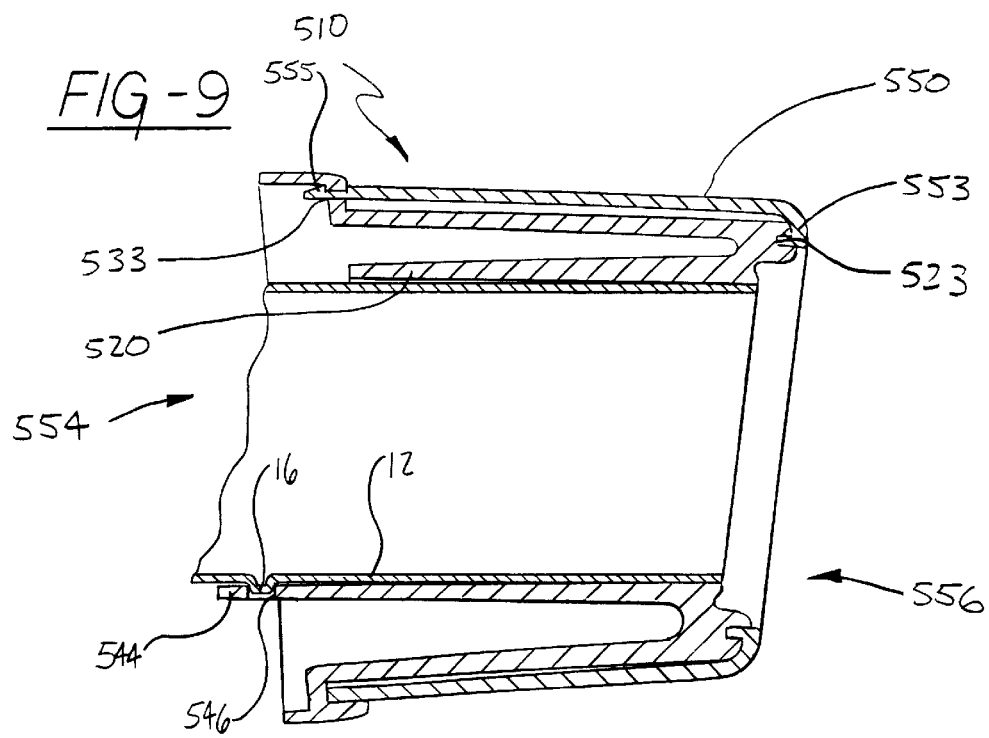
FIG. 9 is a cross-sectional view of a fully assembled version of the dual passage exhaust tip of FIG. 8.

FIGS. 8 and 9 illustrate yet another embodiment that depicts a dual passage exhaust tip 510 in which a decorative cover 550 is mounted to a heat shield 520 using fastening tabs 555 interlocked into slots 533 at an upstream end 554 of the exhaust tip 510. The decorative cover 550 is further supported on the heat shield 520 by a lip portion 553 interlocked with a recess portion 523 at a downstream end 556. In turn, the heat shield 520 is fastened to the tailpipe 12 using a resilient tang 544 similar to that shown in FIG. 5. Here, however, the resilient tang 544 includes a recessed portion 546 that interlocks with a projection 16 on the tailpipe 12.

FIG. 9A illustrates a variation of the dual passage exhaust tip 510 of FIGS. 8 and 9. Here, a dual passage exhaust tip 510A includes a split-clamshell heat shield 520A that mounts over a dual exhaust tailpipe 512A. The heat split-clamshell shield 520A is split into an upper and lower portion 521A and 523A. The split-clamshell heat shield 520A includes a recess 538A formed in the upper portion 521A, that mates with a projection 516A formed on the dual exhaust tailpipe 512A for locating and fastening the split-clamshell heat shield 520A to the dual exhaust tailpipe 512A. Similarly, a decorative cover 550A will encapsulate the assembled split-clamshell heat shield 520A and includes a recess 551A on opposite sides thereof that mates with a projection 544A on opposite sides of each of the portions 521A and 523A of the assembled split-clamshell heat shield 520A, for locating and fastening the decorative cover 550A to the split-clamshell heat shield 520A.

Figure 10:
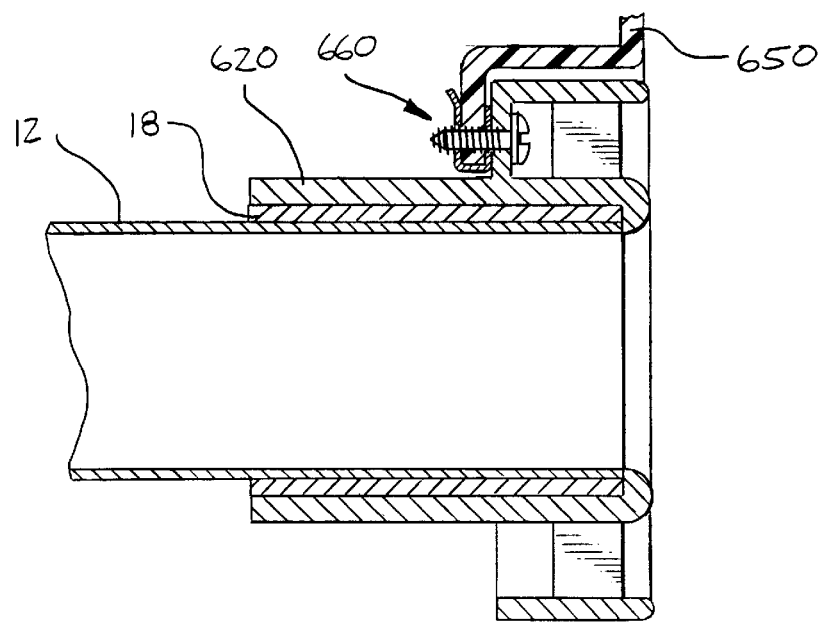
FIG. 10 is a cross-sectional view of yet a further embodiment illustrating an exhaust tip directly attached to a thermoplastic automobile fascia.

FIG. 10 illustrates a further embodiment wherein a heat shield 620 is attached to thermoplastic fascia 650. Thermoplastic fascia 650 is typically composed of Thermoplastic Polyolefin (TPO) that may be a painted or unpainted weatherable material. Here the thermoplastic fascia 650 is fastened to the heat shield 620 by a fastening system 660 such as a J-clip and screw combination. In turn, the heat shield 620 may be attached to the tail pipe 12, such as by an interference fit as shown. Alternatively, the heat shield 620 may be free, via a clearance fit with the tail pipe 12, to enable forward and aft tolerance during assembly or operation. Additionally, an insulator 18 may be placed between the tail pipe 12 and heat shield 620 to further insulate the thermoplastic fascia 650 against thermal effects in high temperature applications.

Figures 11, 12:
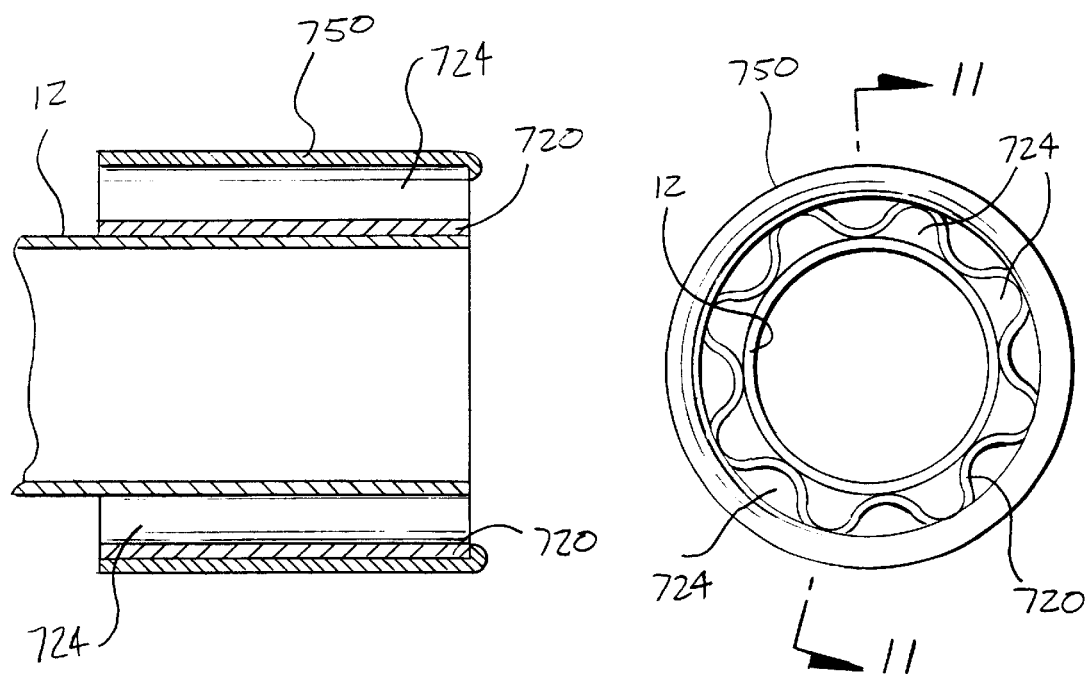
FIG. 11 is a cross-sectional view of the final embodiment of the present invention illustrating an exhaust tip having a corrugated heat shield.
FIG. 12 is an end view of the exhaust tip of FIG. 11.

FIGS. 11 and 12 illustrate yet another embodiment in which a corrugated heat shield 720 may be placed between the tailpipe 12 and a decorative cover 750. The corrugated heat shield 720 may be composed of metal or thermoset material. The corrugated heat shield 720 is particularly conducive to the present invention since the corrugation inherently provides axial passages 724 through which cooling air may flow. The corrugated heat shield 720 is integrally fastened to the tailpipe 12 by virtue of an interference fit therebetween. Likewise, the decorative cover 750 is integrally fastened to the corrugated heat shield 720 via an interference fit therebetween.

Figure 13:
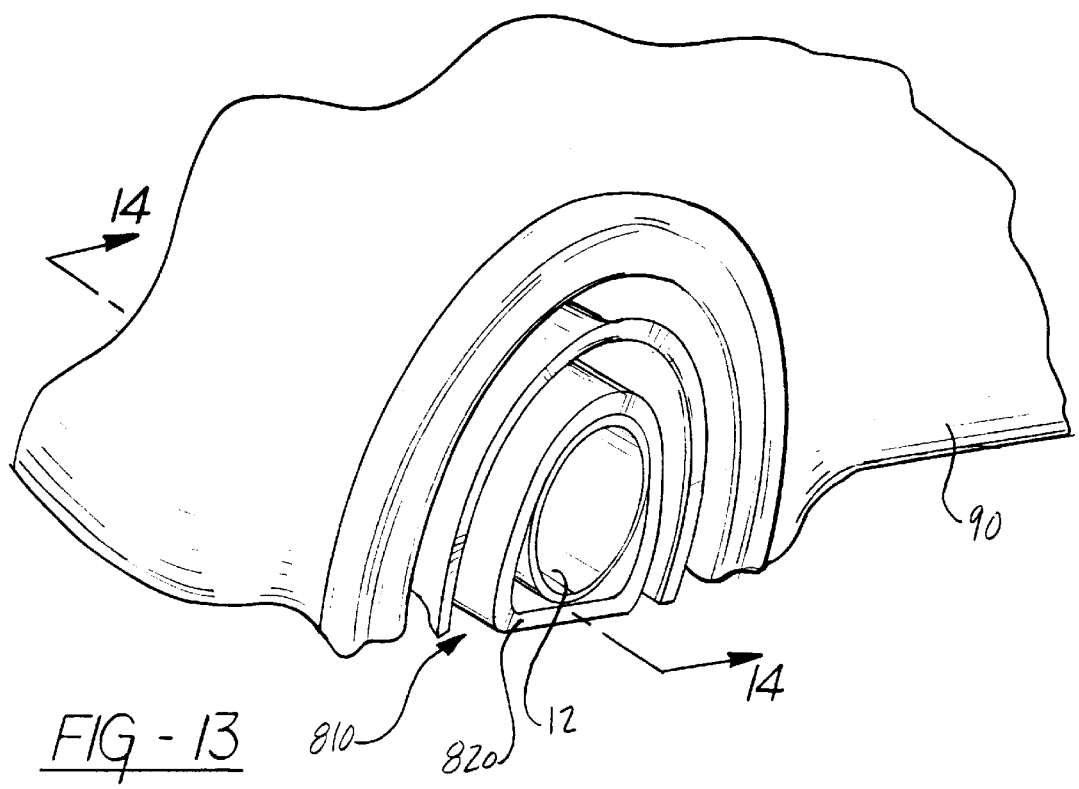
FIG. 13 is a rear view of a rear fascia of a vehicle showing a tailpipe, and an exhaust tip fastened between the tailpipe and fascia.
Figure 14:
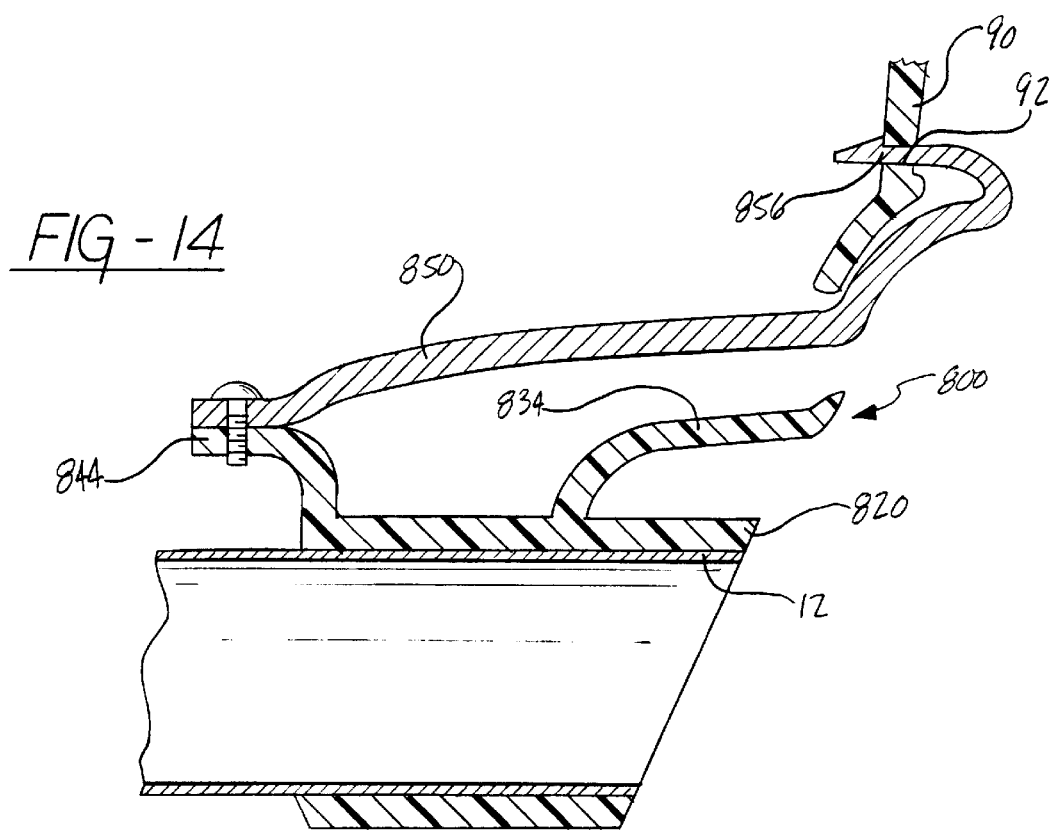
FIG. 14 is a cross-sectional view of the rear fascia, exhaust tip, and tailpipe of FIG. 13 taken along line 14—14.

FIGS. 13 and 14 illustrate another embodiment of an exhaust tip 810 interconnected to a thermoplastic fascia 90 of a vehicle. Here, a heat shield 820 circumscribes the tailpipe 12 and is integrally fastened thereto via an interference fit therebetween. FIG. 14 shows a cross section of FIG. 13 along 14—14. The heat shield 820 includes a fastening flange 844 for spacing a decorative cover 850 a predetermined distance away from the tailpipe 12 and for fastening the decorative cover 850 to the heat shield 820. The heat shield 820 includes a shroud 834 extending outwardly therefrom to further insulate the decorative cover 850 from the tailpipe 12. The decorative cover 850 extends axially rearward from the fastening flange 844 and terminates in a resilient tab portion 856. The resilient tab portion 856 locates and interlocks within a slot 92 formed within the thermoplastic fascia 90, consistent with well-known plastic component fastening techniques. The decorative cover 850 and thermoplastic fascia 90 may include any desired number of such tabs 856 and slots 90.

Figure 15:
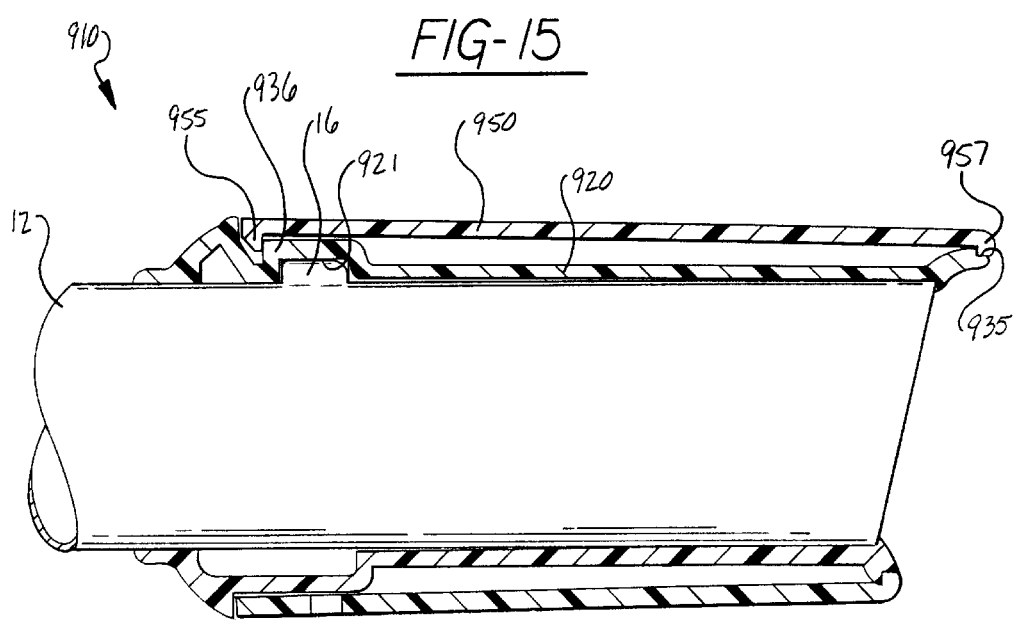
FIG. 15 is a cross-sectional view of a tailpipe and exhaust tip according to an alternative embodiment of the present invention.

Finally, FIG. 15 illustrates an exhaust tip 910 according to another alternative embodiment of the present invention. A decorative cover 950 is assembled over a heat shield 920 in a downstream direction until an upstream projection 955 on the decorative cover 950 snaps behind a shoulder portion 936 of the heat shield 920 to locate and fasten the decorative cover 950 to the heat shield 920. Simultaneously, a downstream projection 957 on the decorative cover 950 pilots to a recessed diameter portion 935 of the heat shield 920 to further locate the decorative cover 950 to the heat shield 920. The exhaust tip 910 is assembled to the tailpipe 12 such that a projection 16 on the tailpipe 12 mates with an internal recess 921 of the heat shield 920 to locate and fasten the exhaust tip 910 to the tailpipe 12.

Referring again to FIGS. 1 through 4, an example of the present invention under operating conditions will be discussed. Under operation, a heat source such as an engine or furnace, will emit exhaust gas downstream through the tail pipe 12 and the exhaust tip 10. At temperatures exceeding 700° F., this exhaust gas could easily damage a conventional exhaust tip if it were composed of polymeric material. Therefore, use of thermoplastics have been avoided in the design of exhaust tips—until now. It is now possible to incorporate decorative thermoplastics in exhaust tip designs due in part to advances in material properties, but primarily due to the novel configuration of the present invention. The present invention is configured to allow use of the decorative thermoplastic exhaust tip 10 by insulating it from the high temperature flow of exhaust gas. This is accomplished using the heat resistant heat shield 20 in a unique intermediary configuration between the decorative cover 50 and the hot tail pipe 12.

Second, in combination with the internal and external standoffs 22 and 26, respectively, the heat shield 20 defines the insulating air pockets or primary and secondary gaps 24 and 28 between the components that act as mini-insulators. Last, the heat shield 20 and decorative cover 50 provide the axial passages 42 and primary and secondary gaps 24 and 28 that permit cool outside air to flow through the exhaust tip 10, thereby cooling the decorative cover 50.

The previously described embodiments have many advantages, including the fact that the polymeric exhaust tip of the present invention is not susceptible to failure due to corrosion as is the prior art. The materials of the present invention do not corrode and, therefore, represent a significant aesthetic value to the consumer. Likewise, since corroded tailpipes need replacement, the present invention minimizes the need for replacement and consequently will save a consumer money.

Another advantage is that the material and manufacture of the present invention tend to be less expensive than traditional metal exhaust tips.

Yet another advantage is that the present invention does not necessarily require an intermediary insulating material, such as fiberglass, to be used to attain the insulating properties necessary to use thermoplastics.

Still another advantage is that the material and configuration of the present invention enables more flexibility in design applications. For example, the material may be easily and cheaply molded to any shape, and the decorative cover will ultimately be cooler than traditional designs. Therefore, the present invention may be seamlessly integrated with other vehicle components, such as thermoplastic fascia, without risk of thermal damage thereto.

While the invention has been described in terms of a preferred embodiment, it is apparent that other forms could be adopted by one skilled in the art. For example, the exhaust tip could be made not only from polymeric materials but from any combination of metal, composite, or polymeric material. In other words, the unique structural design and configuration of the exhaust tip is what enables use of a variety of materials. Accordingly, the scope of the present invention is intended to be limited only by the following claims.

What is claimed is:

1. An exhaust assembly for attachment to an exhaust pipe, said exhaust assembly comprising:
   a heat shield at least partially surrounding and fastened to said exhaust pipe; and
   a decorative cover at least partially surrounding and fastened to said heat shield;
   said heat shield insulating said decorative cover from thermal effects of said exhaust pipe and spacing said decorative cover a predetermined distance away from said exhaust pipe.

2. The exhaust assembly as claimed in claim 1, wherein a portion of said heat shield is spaced a predetermined distance away from said exhaust pipe such that a primary insulating gap is defined therebetween.

3. The exhaust assembly as claimed in claim 1, wherein a portion of said decorative cover is spaced a predetermined distance away from said heat shield such that a secondary insulating gap is defined therebetween.

4. The exhaust assembly as claimed in claim 1, wherein said heat shield includes an upstream end comprising a vent opening therein for cooling air to pass therethrough.

5. The exhaust assembly as claimed in claim 1, wherein said decorative cover includes an upstream end comprising a vent opening therein for cooling air to pass therethrough.

6. The exhaust assembly of claim 1, further comprising: means for fastening said heat shield to said exhaust pipe.

7. The exhaust assembly of claim 6, wherein said fastening means includes a fastener projecting through said heat shield and said exhaust pipe and being selected from the group comprising screws, rivets, and the like.

8. The exhaust assembly of claim 6, wherein said fastening means includes a fastener surrounding said heat shield and said exhaust pipe and being selected from the group of compression fasteners comprising compression rings, hose clamps, and the like.

9. The exhaust assembly of claim 1, wherein said exhaust pipe comprises at least one integral fastening feature thereon and said heat shield comprises at least one integral fastening feature thereon interlocking with said at least one integral fastening feature of said exhaust pipe to fasten said heat shield to said exhaust pipe.

10. The exhaust assembly of claim 1, wherein said heat shield comprises a shoulder portion and at least one resilient tab thereon, further wherein said decorative cover comprises a reduced diameter portion thereon, where said reduced diameter portion mounts over said at least one resilient tab and abuts said shoulder portion whereby said reduced diameter portion is entrapped between said at least one resilient tab and said shoulder portion.

11. The exhaust assembly of claim 1, wherein said heat shield comprises an upstream member at least partially surrounding said exhaust pipe and a downstream member attached to said upstream member and at least partially surrounding said exhaust pipe, said downstream member extending downstream from said upstream member such that said heat shield is a two piece assembly.

12. The exhaust assembly of claim 11, wherein said decorative cover attaches with said upstream member and connects to said downstream member such that said exhaust assembly comprises a three piece assembly.

13. The exhaust assembly of claim 1, wherein said heat shield comprises a second integral fastening feature thereon and further wherein said decorative cover comprises an integral fastening feature thereon interlocking with said second integral fastening feature of said heat shield to attach said decorative cover to said heat shield.

14. The exhaust assembly of claim 1, wherein said heat shield is comprised of an upper and lower portion such that said heat shield is a split clamshell assembly.

15. The exhaust assembly of claim 1, wherein said decorative cover comprises a thermoplastic fascia, and further wherein said heat shield is fastened to said thermoplastic fascia.

16. The exhaust assembly as claimed in claim 15, wherein said decorative cover is fastened to said thermoplastic fascia, and said heat shield is composed of a paintable and weatherable material.

17. The exhaust assembly of claim 1, further comprising an insulator placed between said exhaust pipe and said heat shield, said insulator providing added insulation for high temperature conditions.

18. The exhaust assembly of claim 1, wherein said heat shield is corrugated thereby defining axial passages for cooling air to flow therethrough.

19. An exhaust tip for attachment to a tailpipe of an engine, said exhaust tip comprising:
   a polymeric heat shield fastened to and at least partially surrounding a portion of said tailpipe; and
   a polymeric decorative cover fastened to and at least partially surrounding a portion of said polymeric heat shield;
   said polymeric heat shield insulating said polymeric decorative cover from thermal effects of said tailpipe and spacing said polymeric decorative cover a predetermined distance away from said tailpipe.

20. The exhaust tip of claim 19, wherein a portion of said polymeric heat shield is spaced a predetermined distance away from said tail pipe such that a primary insulating gap is defined therebetween.

21. The exhaust tip of claim 19, wherein a portion of said polymeric decorative cover is spaced a predetermined distance away from said polymeric heat shield such that a secondary insulating gap is defined therebetween.

22. The exhaust tip of claim 19, further comprising:

means for fastening said polymeric heat shield to said tailpipe, said fastening means comprising a fastener projecting through said polymeric heat shield and said tailpipe.

23. The exhaust tip of claim 22, wherein said fastener is selected from the group comprising screws, rivets, and the like.

24. The exhaust tip of claim 19, wherein said polymeric heat shield comprises at least one resilient tab thereon and said tailpipe comprises at least one recess therein, said at least one resilient tab interlocking with said at least one recess to fasten said polymeric heat shield to said tailpipe.

25. The exhaust tip of claim 19, wherein said polymeric heat shield comprises a shoulder portion and at least one resilient tab thereon and said polymeric decorative cover comprises a reduced diameter portion thereon, said reduced diameter portion mounting over said at least one resilient tab and abutting said shoulder portion, whereby said reduced diameter portion is entrapped between said at least one resilient tab and said shoulder portion.

26. The exhaust tip of claim 19, wherein said polymeric heat shield comprises at least one standoff thereon, said at least one standoff maintaining said space between said polymeric heat shield and said polymeric decorative cover.

27. The exhaust tip of claim 19, wherein said polymeric heat shield is composed of a thermoset material and said polymeric decorative cover is composed of a thermoplastic material.

28. The exhaust tip of claim 27, wherein said thermoset material is composed of a polyvinylester material and said thermoplastic material is composed of a polycarbonate acrylontrile-butadiene-styrene material.

29. The exhaust tip of claim 28, wherein said polymeric decorative cover has a chrome plate finish thereon.

30. The exhaust tip of claim 28, wherein said polymeric decorative cover has a paint finish thereon.

31. An exhaust tip affixed to an end of a tailpipe for use on an exhaust system, said exhaust tip comprising:

a thermoset heat shield fastened to a portion of said tailpipe and at least partially surrounding said end of said tailpipe; and a thermoplastic decorative cover comprising an upstream end and an upstream opening therethrough, said thermoplastic decorative cover at least partially surrounding said thermoset heat shield;

said thermoset heat shield insulating said thermoplastic decorative cover from thermal effects of said tailpipe and spacing said thermoplastic decorative cover a predetermined distance away from said tailpipe.

32. The exhaust tip of claim 31, wherein said tailpipe has at least one recess therein, said thermoset heat shield further comprising at least one tab, said at least one tab interlocking with said at least one recess to fasten said thermoset heat shield to said tailpipe.

33. The exhaust tip of claim 31, wherein said thermoset heat shield comprises a shoulder portion thereon and a neck portion adjacent said upstream end of said thermoplastic decorative cover, said neck portion comprising at least one resilient tab thereon, said upstream opening of said thermoplastic decorative cover mounting over said neck portion past said at least one resilient tab and adjacent said shoulder portion such that said upstream end of said thermoplastic decorative cover is entrapped between said shoulder portion and said at least one resilient tab.

34. The exhaust tip of claim 31, wherein said thermoset heat shield comprises at least one vent opening therein to permit air to flow between said thermoset heat shield and said tailpipe to cool said exhaust tip.

35. The exhaust tip of claim 31, wherein said thermoplastic decorative cover further comprises at least one vent opening therein to permit air to flow between said thermoset heat shield and said thermoplastic decorative cover to cool said exhaust tip.

* * * * *

UNITED STATES PATENT AND TRADEMARK OFFICE
CERTIFICATE OF CORRECTION

| | | |
|---|---|---|
| PATENT NO. | : 7,007,720 B1 | Page 1 of 1 |
| APPLICATION NO. | : 09/542410 | |
| DATED | : March 7, 2006 | |
| INVENTOR(S) | : Lee A. Chase and Kevin Paul Burch | |

It is certified that error appears in the above-identified patent and that said Letters Patent is hereby corrected as shown below:

In Column 1, Line 9, after "system" kindly insert --.--.

In Column 2, Line 58, kindly delete "polymers" and insert --polymeric--.

In Column 3, Line 50, kindly delete "cross section" and insert --cross-section--.

In Column 3, Line 66, kindly delete "cross section" and insert --cross-section--.

In Column 4, Line 18, kindly delete "cross section" and insert --cross-section--.

In Column 4, Line 44, kindly delete "cross section" and insert --cross-section--.

In Column 5, Line 36, kindly delete "heat split-clamshell" and insert --split-clamshell heat--.

In Column 6, Line 15, kindly delete "cross section" and insert --cross-section--.

In Column 6, Line 62, before "Second," kindly insert --Still referencing Figs. 1 through 4, the heat shield 20 insulates the decorative cover 50 in various ways. First, the heat shield 20 acts as an insulator, owing to the insulating qualities of the thermoset material itself. In this way, the heat shield 20 shows heat transfer from the tailpipe 12.--

In Column 8, Line 38, kindly delete "split clamshell" and insert --split-clamshell--.

Signed and Sealed this

Twenty Second Day of April, 2008

JON W. DUDAS
*Director of the United States Patent and Trademark Office*